Jan. 21, 1941.          C. SKLAREK          2,229,194
ANTITHEFT LIGHT ATTACHING BRACKET
Filed Aug. 13, 1938
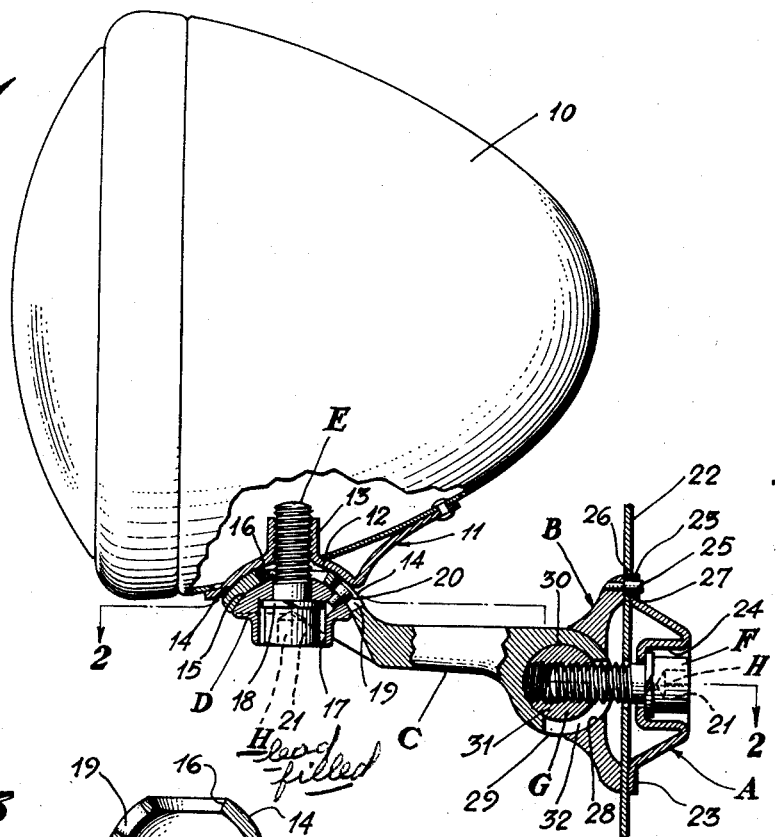
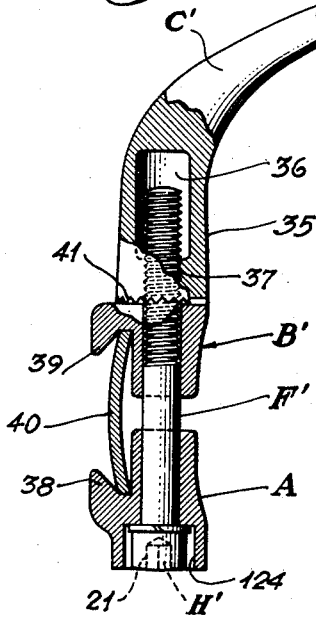
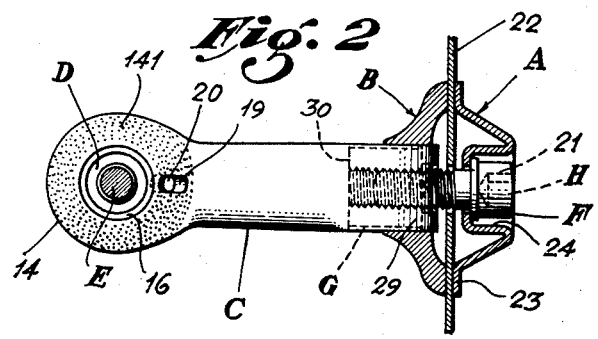
CLIFFORD SKLAREK.
INVENTOR;
BY Joseph Harris
ATTORNEY.

Patented Jan. 21, 1941

2,229,194

UNITED STATES PATENT OFFICE 2,229,194

ANTITHEFT LIGHT ATTACHING BRACKET

Clifford Sklarek, Los Angeles, Calif.

Application August 13, 1938, Serial No. 224,766

2 Claims. (Cl. 248—203)

This invention relates to improvements in Antitheft light attaching bracket, and the present application is similar in subject matter to my co-pending application No. 140,377, filed May 3, 1937 for improvement in Convertible spot and fog light.

As is well known, many automotive vehicles, such as automobiles and trucks, are now equipped with lights auxiliary or additional to the usual headlights put on by the manufacturer, such as so-called fog lights and road lights. These auxiliary lights are usually attached to the bumper by ordinary bolt clamp brackets which are not only more or less unpleasing in appearance, but also may readily be removed by any unauthorized person in a few seconds, merely by the use of an ordinary wrench. So easily may such auxiliary lights attached by ordinary clamp brackets be removed, that the theft thereof has become very frequent, with the result that many car owners refuse to buy such lights for fear of theft with consequent loss.

One object of the present invention, therefore, is to provide an automotive vehicle fog or other auxiliary light attaching bracket or support which is theft proof under all ordinary conditions and which can only be removed by the aid of special equipment and requiring such length of time for removal as to practically preclude theft.

Another object of the invention is to provide a bracket or support of the type indicated in the preceding paragraph which provides for universal adjustment of the light proper to thereby adapt the light for attachment to the best available or preferred portion of the vehicle such as the bumper or fender.

More specific objects of the invention are to provide a support or bracket of the type indicated which is attractive in appearance, may be easily applied and is economical to manufacture.

Other objects of the invention will more clearly appear from the description and claims hereinafter following.

In the drawing forming a part of this specification, Figure 1 is a part elevational view, part vertical sectional view, illustrating one embodiment of the invention, as adapted for application to the fender of an automobile. Figure 2 is a sectional view, corresponding substantially to the section line 2—2 of Figure 1. And Figure 3 is a part elevational view, part vertical section of a bracket modified for attachment to a bumper of an automobile.

In said drawing, and referring first to the structure illustrated in Figures 1 and 2, the fog light or road light is shown conventionally, the same having a shell or head 10, to the underside of which is riveted or otherwise permanently secured a stamping 11 having a convex ball-shaped bearing seat 12 and an interiorly threaded section 13 extending inwardly therefrom to the interior of the head 10.

The bracket or support proper comprises two clamping elements A and B; a bracket arm C; a washer D; two bolts E and F; a nut G; and plugs H—H.

The outer end of the bracket arm C is provided with a ball-shaped section providing, on its outer side, a convex ball-shaped bearing seat 14 cooperable and engageable with the bearing seat 12. On the inner side thereof, a ball-shaped socket 15 is formed within which is seated the washer D, the latter having a convex ball-shaped surface engageable with the surface 15, whereby to provide unversal adjustment therebetween. Said ball-shaped end of the bracket arm is provided with an aperture 16 of a diameter appreciably greater than the diameter of the shank of the bolt E so that, as will be apparent, universal adjustment between the lamp head 10 and the end of the bracket arm C is permitted within such limits as may be determined upon.

The washer D, in addition to being apertured for the reception of the shank of the bolt E, is also formed with a cylindrical recess 17 only slightly larger than the cylindrical head of the bolt E and of such depth as to receive the head of the bolt E therewithin at least flush so that the exterior of the bolt head cannot be reached or operated upon by any wrench or the like applied to the outer surface thereof. Preferably, a lock washer 18 is interposed between the bolt head and the base of the recess 17 to prevent loosening of the bolt from vibration.

The outer end of the bracket arm C is also provided with a slot 19 in which is received a pin or other projection 20 integral or fixedly attached to the washer D.

In carrying out the antitheft features of the present invention as applied to the attachment between the bracket arm and the lamp head, the two engaging ball surfaces of the bracket arm and lamp head will be so finished as to provide roughened formations as indicated at 141 in Figure 2. Preferably, these formations will be obtained by a series of finely indented dots or depressions in the surface of the stamping 11 and by leaving the cooperable surface of the bracket arm as an unfinished sand casting. Other expedients may obviously be employed provided that the engaging ball surfaces are such that, when firmly clamped together, there will be more or less indentation of the metal of one part into that of the other sufficient to prevent relative rotation therebetween.

In furtherance of the antitheft feature, the head of the bolt E will preferably be provided with a socket 21 for the reception of a socket wrench specially made therefor and in which, when the bolt has been screwed up tight as illustrated in the drawing, will be inserted the plug H, preferably of lead or other malleable material that may be hammered in to thoroughly fill the socket 21 and prevent insertion of a tool.

With the construction described, it is evident that the lamp head cannot be rotated with reference to the bracket as hereinbefore pointed out. Neither may the washer D be rotated with reference to the bracket by reason of the lug or projection 20 engageable with the bracket arm as previously described. As further obvious, the bolt cannot be actuated unless by a special socket wrench and then only after the plug H has either been melted out or drilled out.

Referring next to the attachment provided by the clamping elements A and B to the fender 22. The clamping element A is formed with a base flange 23 engageable with the inner or underside of the fender and is formed with a cylindrical recess 24 to receive the washer and cylindrical head of the bolt F, the latter being constructed similarly to the bolt E and employing a plug H in a similar manner.

The clamping element B, which may be in the form of a casting, is formed to seat against the front or outer face of the fender and in addition is provided with a pin or lug 25 secured thereto and adapted to be entered through an aperture 26 drilled in the fender and received in a corresponding aperture 27 in the clamping member A. With this construction, as will be apparent, when the elements A and B are clamped to the fender, the same can neither be rotated as an entirety relative to the fender, nor may one be rotated relative to the other. Obviously, the bolt cannot be turned for reasons apparent previously given in connection with the bolt E.

To provide for angular adjustment between the bracket arm C and the clamping element B, the latter is formed with a cylindrical bearing seat 28 and the former with a cylindrical journal 29 cooperable therewith. Said end of the arm C is formed with a transversely extending circular recess 30 within which is received a cylindrical nut 31. An arcuate slot 32 is also provided in the bracket arm to receive the shank of the bolt F and allow of the desired angular movement. As will be apparent, when the bolt F is tightened, the same serves the dual function of clamping the bracket arm C in adjusted position and clamping the two elements A and B to the fender. In this connection, it will be observed that the shank of both bolts E and F are completely housed, thus providing both a neat, pleasing construction and at the same time, rendering the shank of the bolt inaccessible for unauthorized turning.

Referring next to the modification shown in Figure 3, the bracket arm C', at its outer end, will be similar to that of the bracket C and will have the lamp head attached thereto in the same manner, as illustrated in Figure 1. Since the bracket arm C' is specially designed for use in conjunction with a bumper, it is made more or less arcuate with a vertical terminal section 35 which is interiorly recessed, as indicated at 36 and threaded, as indicated at 37 to house the threaded shank end of the bolt F'. In this construction, the two clamping elements A' and B' are each formed with jaws 38 and 39 to engage over the opposite edges of the bumper 40, it being obvious that, when clamped to the latter, neither of the elements A' or B' can be rotated with reference to each other or with reference to the bumper. The clamping element A' is provided with a recess 124 to receive the head of the bolt F' and lock washer in a similar manner to that described in connection with the bolts E and F and washer D and clamping element A. As will further be understood, the bolt F' will be similar to the bolts E and F except that it will have a longer shank to accommodate the bracket for attachment to bumpers of varying width, in which connection, the recess 36 of the bracket C' will be sufficiently elongated to house the end of the bolt shank within all desirable limits.

To provide for angular adjustment between the bracket arm C' and clamping element B', the opposed engaging surfaces thereof will be relatively deeply serrated, as indicated at 41. When the bracket arm is clamped in position, it is apparent that said serrations will prevent rotation of the bracket arm relative to the clamping elements or bumper so that attachment to the bumper is likewise antitheft, as previously described in connection with the structure shown in Figures 1 and 2.

With the constructions shown and described, unauthorized removal of any of the parts cannot be made by the use of ordinary wrenches, nor can any of the parts be removed even with a specially formed socket wrench except by first removing the plugs from the bolt heads. This latter operation obviously would require the application of either heat or the drilling out of the plug, which would require so much time and attract so much attention as to practically eliminate danger of theft under any ordinary or usual conditions.

Although there has herein been shown and described what is now considered the preferred manner of carrying out the invention, the same is merely illustrative and not by way of limitation. All changes and modifications coming within the scope of the appended claims are contemplated.

What is claimed is:

1. In a device of the character described, the combination with a lamp head; of a bracket arm; antitheft means connecting one end of said arm and the lamp head; and antitheft means for attaching the opposite end of said arm to an automobile fender having a pair of apertures therein, said means comprising two clamping elements, and a bolt, said clamping elements being complementally formed to fit the inner and outer sides of the fender, the inner element having a recess to receive the bolt head therein, the outer element and adjacent end of the bracket arm having cooperable cylindrical formations providing angular adjustment for the bracket arm, the bolt having its shank extended through the clamping elements and adapted to pass through one of the apertures in the fender and thereby to frictionally hold the bracket arm in adjusted angular position, one of said clamping elements having a fixed projection adapted to be entered through the other aperture of the fender and into an aperture of the other clamping element.

2. In a bracket of the character described, the combination with a lamp head having a concave ball-shaped bearing seat and a female threaded section extending inwardly of the head therefrom; of a bracket arm having, at one end thereof, a cooperating, apertured, convex ball-shaped bearing seat on one side and a concave ball-shaped socket on its opposite side, one of said bearing seats having a roughened surface providing small projections such that, when the two bearing seats are clamped together under pressure, the projections will partially imbed in the opposed bearing seat and thereby prevent relative rotation therebetween; a washer apertured for the reception of a bolt therethrough and having a convex bearing surface on one side engageable and cooperable with said ball-shaped socket and, on its other side, a cylindrical recess to receive a bolt head at least flush therein; interengaging means on the washer and bracket arm preventing relative rotation therebetween; a bolt having its shank extending through said apertures and engaging said threaded section of the lamp head and serving to tightly clamp together the lamp head, bracket arm and washer and thereby prevent relative rotation between the lamp head and bracket arm, the head of the bolt being cylindrical and of only slightly less diameter than the diameter of the washer recess and disposed at least flush within the washer recess, whereby the cylindrical surface of the bolt head is rendered inaccessible for actuation by a tool, the end of the bolt head having a socket for actuation by a socket wrench; a plug filling the bolt head socket; and antitheft means for attaching the opposite end of said bracket arm to a fixed member of a vehicle or the like.

CLIFFORD SKLAREK.